J. O. PARRISH.
COMBINED VEHICLE SPRING AND SHOCK ABSORBER.
APPLICATION FILED MAR. 31, 1913.
1,120,235.
Patented Dec. 8, 1914.
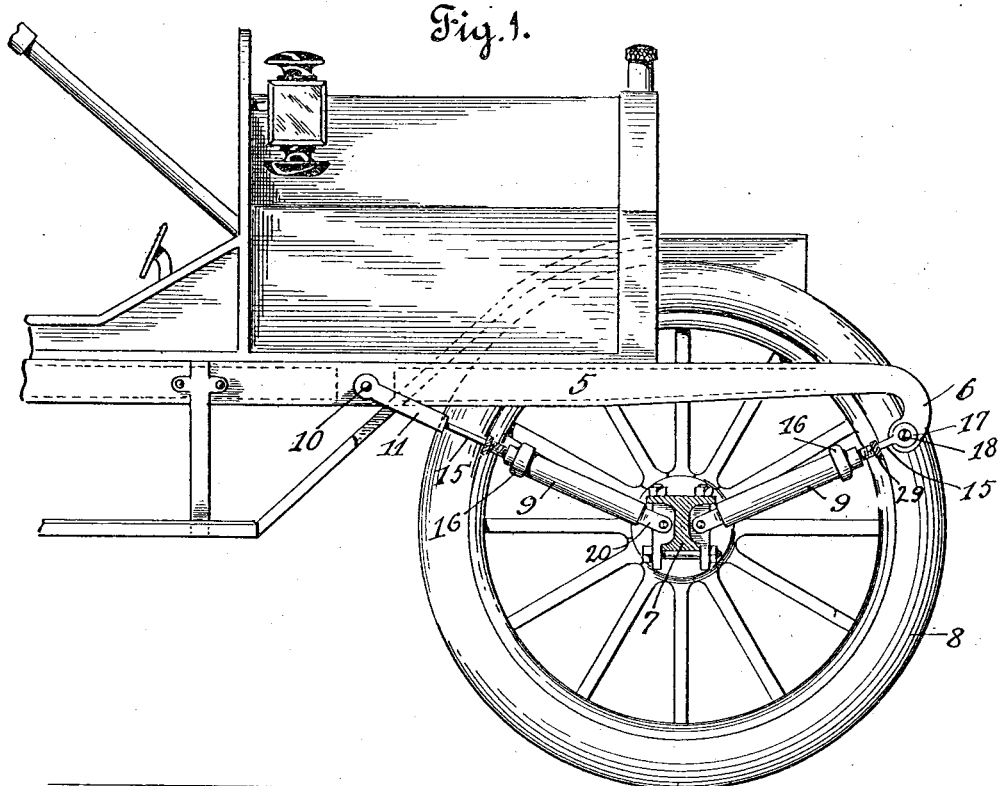
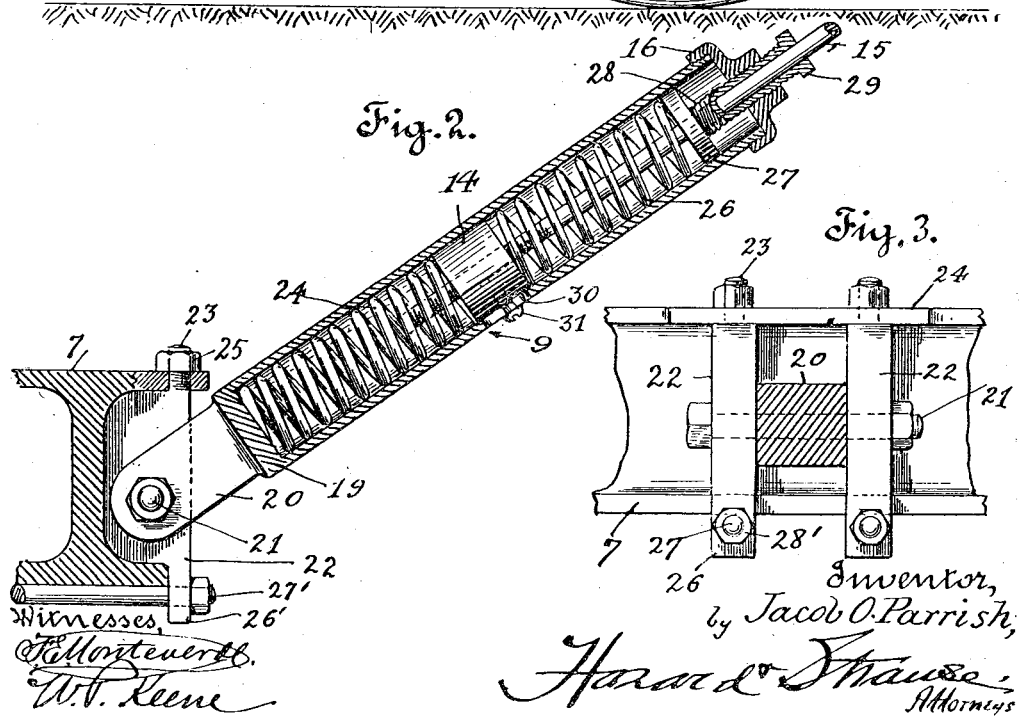

UNITED STATES PATENT OFFICE.

JACOB O. PARRISH, OF POMONA, CALIFORNIA.

COMBINED VEHICLE-SPRING AND SHOCK-ABSORBER.

1,120,235. Specification of Letters Patent. Patented Dec. 8, 1914.

Application filed March 31, 1913. Serial No. 757,729.

*To all whom it may concern:*

Be it known that I, JACOB O. PARRISH, a citizen of the United States, and residing in the city of Pomona, county of Los Angeles, and State of California, have invented a new and useful Improvement in Combined Vehicle-Springs and Shock-Absorbers, of which the following is a specification.

This invention relates to vehicle springs, and the principal object is to provide a combined vehicle supporting spring and shock absorber.

It is a further object to inclose the springs in a cylindrical casing, and to provide means to adjust the tension of the springs as well as the length of the spring rod.

In the drawings accompanying this specification and forming therewith the application for Letters Patent: Figure 1 is an elevation of one portion of the frame of an automobile showing the springs applied thereto, the axle being in section. Fig. 2 is a longitudinal section of the casing showing the springs and the adjusting means therefor. Fig. 3 is a front view of the clips which are applied to the I-beam axle.

More specifically in the drawings, 5 designates the frame of an automobile having the spring hook 6 formed thereon, adjacent the axle 7 and wheel 8. Interposed between the hook 6 and the axle 7 is the spring member 9 secured to the hook and the axle and spaced a proper distance in the opposite direction on the frame is the pivot 10 to which is pivotally secured the strap 11, which forms a portion of a second spring member 9 secured to the opposite side of the axle.

The spring casing for member 9 is preferably a cylindrical or tubular structure, within which is reciprocally mounted the piston 14 which is connected to the piston rod 15. This rod is threaded in its engagement with the piston 14 and in turn is carried through a concentric bore in the closing cap 16 of the casing, and at its outer end is provided with an eye 17 which is secured by pivot pin 18 to the frame, the rearwardly disposed piston rod being connected to the strap 11.

The closed end 19 of the cylindrical casing is provided with a lug 20 which is preferably bored to receive a pivot pin 21 which is secured between the blocks 22, a pair of these blocks being provided to engage with the axle, as described hereafter. Intermediate of the closed end 19 and the plunger 14 of the cylinder, is mounted the coil spring 24, which is preferably of such length that it retains the plunger 14 on a tension approximately midway of the length of the cylindrical casing.

Bearing upon the opposite face of the plunger 14, and encircling the piston rod, is a lighter weight coiled spring 26, which bears against the annular washer 27 which takes up on the inner end of the threaded sleeve 28, through which the plunger rod 15 is carried and slidably mounted. This threaded sleeve engages with a concentric threaded bore in the cap 16, and is provided at its outer end with a knurled rim 29 or wrench face as desired. By turning this sleeve inwardly spring 26 is placed under more compression and further restricts the action of the compression spring 24.

A longitudinal slot 30, or a plurality of slots are cut in the wall of the casing adjacent the portion where the piston slides, and a headed screw pin 31 carried through said slot into a threaded bore in the piston to prevent displacement of the latter and assist in the adjustment of the spring tension, as well as allowing adjustment of the length of the rod 15, for different sized frames or to level the car.

The blocks 22 described as forming a pivotal support for the lower end of the spring unit are preferably U-shaped structures which fit intermediate of the upper and lower flanges of the I-beam axle frame. The upper portion is provided with studs 23 which are preferably threaded, and project through suitable bores in the upper flange 24 of the I-beam, nuts 25 being applied to secure this portion of the block.

Flanges 26' are provided extending from the lower outer edges of the blocks, which are preferably carried below the lower flange of the I-beam and are provided with a bore so disposed that a bolt 27' carried transversely of the beam will engage with the bore in the flange on the opposite side of the I-beam and be carried through the flange of the oppositely disposed block to secure the latter, by means of a nut 28'.

The action on the springs will be readily understood, the weight upon the frame compressing the springs 24, and when these latter rebound the plunger is inhibited or restricted in its action by the recoil spring 26, the piston being guided by the pin 30.

What I claim is:

1. In a vehicle spring in combination with a frame of a vehicle and an I-beam axle adjacent thereto, of pivot blocks secured to said I-beam, a cylindrical casing pivoted intermediate a pair of said blocks, a spring mounted in said casing adjacent its pivoted end, a plunger slidably mounted in and bearing against said spring, a plunger rod adjustably connected to said plunger, means to guide said piston, means to pivot the free end of said rod to said vehicle frame, a recoil spring bearing against the outer face of said plunger and encircling said plunger rod, a flange engaging the outer end of said spring and embracing said plunger rod, a cap to said casing provided with a threaded bore, and a threaded sleeve mounted in said threaded bore, whereby adjustment of the tension of said springs may be effected.

2. In a vehicle spring in combination with a frame of a vehicle and an axle adjacent thereto, of pivotal means secured to said axle, a cylindrical casing pivoted to said pivotal means, a spring mounted in said casing adjacent its pivoted end, a plunger slidably mounted in and bearing against said spring, a plunger rod adjustably connected to said plunger, means to guide said plunger, means to pivot the free ends of said rod to said vehicle frame, a closure for said cylinder adapted to encircle said plunger rod, and adjustable means interposed between said closure and said plunger, and a coil spring mounted between said adjusting means and said plunger and adapted to encircle said plunger rod, whereby adjustment may be made of the component springs inclosed within the casing independently of each other.

In witness that I claim the foregoing I have hereunto subscribed my name this 10th day of March, 1913.

JACOB O. PARRISH.

Witnesses:
 EDMUND A. STRAUSE,
 MARIE BATTEY.

Copies of this patent may be obtained for five cents each, by addressing the "Commissioner of Patents, Washington, D. C."